United States Patent
Strobel

(10) Patent No.: US 6,731,281 B1
(45) Date of Patent: May 4, 2004

(54) METHOD FOR TWO-DIMENSIONAL PIXEL REPRESENTATION OF OBJECTS ON A DISPLAY DEVICE

(75) Inventor: Andreas Strobel, Weissenhorn (DE)

(73) Assignee: Avanion GmbH, Berlin (DE)

( * ) Notice: Subject to any disclaimer, the term of this patent is extended or adjusted under 35 U.S.C. 154(b) by 0 days.

(21) Appl. No.: 09/541,590

(22) Filed: Apr. 3, 2000

(30) Foreign Application Priority Data

Apr. 3, 1999 (DE) .......................................... 199 15 308

(51) Int. Cl.[7] .............................................. G06T 17/20
(52) U.S. Cl. ...................... 345/423; 345/426; 345/582; 345/589; 345/609
(58) Field of Search ................................ 345/423, 426, 345/582, 589, 597, 606, 624

(56) References Cited

U.S. PATENT DOCUMENTS 5,138,699 A * 8/1992 Minor et al.
5,283,860 A * 2/1994 Einkauf et al. ............. 345/624
5,790,134 A * 8/1998 Lentz

FOREIGN PATENT DOCUMENTS

| DE | 197 14 915 | 10/1998 |
| EP | 0 243 644 | 11/1987 |
| EP | 0 442 682 | 8/1991 |
| WO | 96/27857 | 9/1996 |

OTHER PUBLICATIONS

Foley, James D., et al., "Computer Graphics—Principles and Practice", Addison–Wesley, 1996, pp. 165–175, 612, 613, 734–737.

* cited by examiner

Primary Examiner—Mark Zimmerman
Assistant Examiner—Kimbinh T. Nguyen
(74) Attorney, Agent, or Firm—Kenyon & Kenyon

(57) ABSTRACT

In a method for two-dimensional pixel representation of an object on a display device, to represent the object surface using polygonal surface elements pixel values are determined for vertices of the surface elements in a central processing unit. The pixel values are transferred, along with the coordinates of the vertices, to an image generating unit such as a graphics card, where the pixel values for all pixels in the representation are determined by interpolation.

2 Claims, 1 Drawing Sheet

METHOD FOR TWO-DIMENSIONAL PIXEL REPRESENTATION OF OBJECTS ON A DISPLAY DEVICE

FIELD OF THE INVENTION

The present invention relates to a method for the two-dimensional pixel representation of objects on a display device based on selectable objects whose respective surfaces are divided into a plurality of polygonal surface elements.

RELATED TECHNOLOGY

The most common arrangements for the two-dimensional representation of objects, in particular for the representation of moving objects and/or representations from different viewing angles or on a variable scale, are those that include a data processing system and a display device controlled by the data processing system. The display device is typically a color monitor with a defined pixel raster.

To control the monitor by pixels, the data processing system (DPS) ordinarily includes a main processor, frequently referred to as the central processing unit (CPU) or simply the processor of the data processing system, as well as an image generating unit, which is designed specifically for generating pixel values and controlling the monitor and is connected to the CPU by an internal data line of the data processing system, in particular an internal bus system. An image generating unit of this type is typically designed as a graphics card that is inserted into a slot of the bus system.

Graphics cards of this type, in turn, contain memory and computing arrangements, for example another processor having multiple arithmetic units, which, however, unlike the general-purpose central processing unit (CPU), can be oriented toward and optimized for the specific image generation tasks. For example, graphics cards are commonly used which automatically generate a two dimensional representation of a three dimensional object that can be defined as a polyhedron with a specific spatial orientation and color information for the individual surface elements according to a lighting model, which, if necessary, is selected from a plurality of lighting models, and can be varied within specific limits via parameters, by means of a processing program provided in the graphics card, with the individual surfaces or surface elements being shaded in accordance with the relative orientation of the model lighting and surface elements of the object. Ordinarily, the reason for transferring processing steps from the CPU to specialized hardware components is to relieve the load on the CPU.

It has been demonstrated, particularly when varying the object representation, that computation-intensive processing operations on the graphics card as well as the amount of data to be transferred from the CPU to the graphics card over the bus system prolong the time needed to set up a new image, even in the case of limiting this data to the object data describing the polyhedron framework, making it difficult to display rapid variations or causing them to appear as sequences of jerky movements.

SUMMARY OF THE INVENTION

An object of the present invention is to provide a method for the two-dimensional pixel representation of objects on a display device which makes it possible to shorten the necessary image setup time and thus shorten the refresh time between modified image representations.

The present invention provides a method for the two-dimensional representation of objects on a display device, the display device being controlled by an image generating unit which, in turn, receives image data from a central processing unit over a data line, and, based on selectable objects whose respective surfaces are divided into a plurality of polygonal surface elements and based on a selectable lighting model, pixel values for controlling the display device being generated by performing arithmetic operations in the central processing unit and in the image generating unit. The vertices of the surface elements and pixel values for the vertices are determined in the central processing unit on the basis of the surface elements of the object and the corresponding lighting model. Coordinates and pixel values of the vertices are transferred to the image generating unit over the data line, and the pixel values of the object pixels reaching the display are generated in the image generating unit by interpolation between the pixel values of the vertices.

The present invention specifically selects a certain distribution of processing steps between the central processing unit (referred to below as CPU for short) and the image generating unit (referred to below as graphics card) and thus certain image data for transmission from the CPU to the graphics card.

The present invention speeds up the image setup time, thus shortening the image refresh times, by reducing the volume of data transferred over the internal bus system as well as by considerably reducing the computing power needed in the graphics card. The latter is achieved, in particular, by transferring to the CPU the measurement of the backscattered luminosity of the individual surface elements according to a selected lighting model (including their immediate periphery without using the bus system). The functions on the graphics card are then largely limited to transforming the three-dimensional coordinates of the surface element vertices to two-dimensional coordinates of the pixel display and interpolating the pixel values within the individual surface elements. These operations require only a small amount of computing power, making it possible to process a large volume of data per time unit in these processing steps. If different interpolation methods are available on the graphics card, an additional parameter to select an interpolation method may also be necessary.

An increase in processing speed can also be achieved by disabling the processing stage provided in the graphics card for calculating energy values based on a lighting model, which can preferably be accomplished with a control command, such as "glDISABLE (GL_LIGHTNING)" in the OpenGL programming language commonly used for hardware pipelines. According to one particularly advantageous embodiment of the present invention, the processing devices (memory, arithmetic units) provided in the graphics card for calculating energy values are also used for interpolation between the vertex pixel values along with the devices normally provided for interpolation within a surface element. An energy value is a quantitative measure of the intensity or luminosity of a pixel. The energy values are preferably measured in the form of value triplets for the three basic colors (red, green, and blue) and output to the display device for pixel by pixel control. The pixel values of the vertices are also advantageously transmitted as energy values for the three basic colors during transmission from the CPU to the graphics card.

Although data processing load is transferred from the graphics card to the CPU according to the present invention, this places very little extra load on the CPU when displaying an object composed of a plurality of surface elements. This is due, in particular, to the fact that a lighting model for representing an object is typically selected in the beginning, and the pixel values are determined at the vertices, as well as the fact that subsequent variations in the representation involve only varying the object viewing direction in the case of the object-related static lighting model and/or changing the scale during representation. In these operations, which appear in the monitor display in the form of a rotation or the object being zoomed in or out, respectively, and which can also be visually perceived as a variation in camera position with the object remaining stationary, the energy values advantageously remain unchanged at the vertices, while only the vertex coordinates vary. Fast algorithms, for example those that include a matrix multiplication, are available for coordinate transformations of this type, ensuring fast conversion with very little additional load on the CPU. On the whole, it is even possible to greatly reduce processing load, since sufficient storage space can be provided in the CPU memory periphery for all vertices of all surface elements and the energy values measured for them, while only the coordinate transformation of the vertices needs to be carried out for one of the object representation variations described above, while retaining the energy values that have also been stored.

Conversely, when measuring the energy values, including those of the vertices, in the conventional manner on the basis of a lighting model in the graphics card, it is no longer possible to store all vertices and their corresponding energy values on the graphics card even in the case of objects of an average complexity, which means that all vertex coordinates, including color information and orientation, must be transferred from the CPU to the graphics card with each variation as mentioned above, with the energy values being determined on the graphics card on the basis of an available lighting model.

With the method according to the present invention, the processing load normally transferred to the graphics card has to be performed in the CPU only when the lighting situation varies. Because experience has shown that lighting variations of this type constitute only a very small portion of the variations in representing an object, we can assume that the overall processing load according to the present invention is considerably reduced.

The surface elements selected for approximating even curved surfaces of an object to be represented are preferably two-dimensional triangles. It has been demonstrated that, with a representation of this type, the interpolation even on the angled intersection line of two triangles that border each other on one side produces an apparently smooth transition without emphasizing the angled line if the same energy values are applied to vertices of the two triangles coinciding with the angled line. However, a desired, abrupt shading transition of an object edge can be easily represented if the energy values of two different surfaces on either side of the surface elements assigned to the edge also differ at the vertices positioned on the edge. The surfaces of the surface elements are preferably assumed to have a perfectly diffuse backscattering effect. However, reflective properties can also be taken into account to a certain extent.

DETAILED DESCRIPTION

Figure 1:
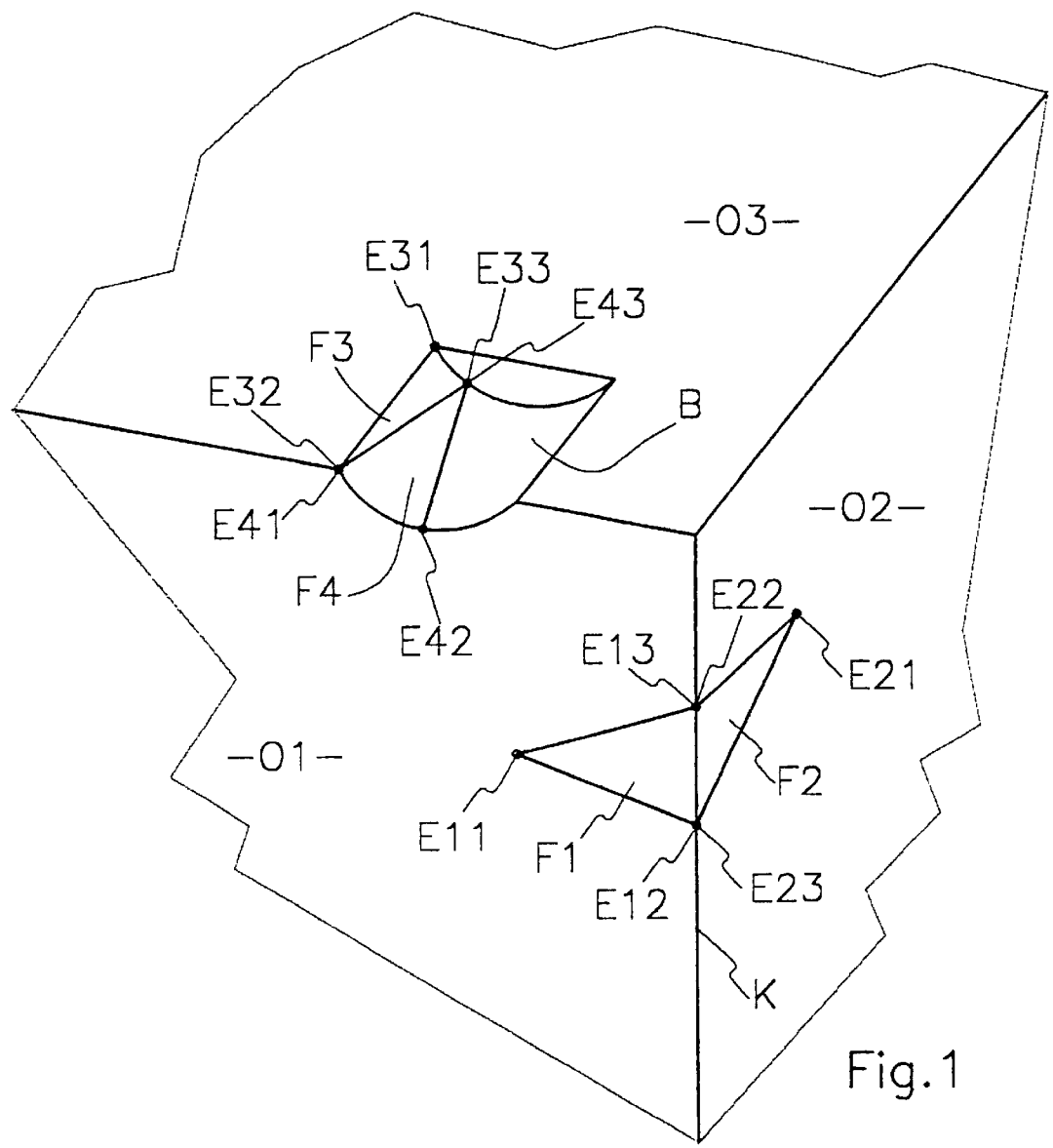
FIG. 1 shows a perspective view of an object having three orthogonal surfaces O1, O2, O3.

A section of an object having, for example, three orthogonal planar surfaces O1, O2, and O3, is illustrated in FIG. 1, with surface O3 having a notch at one edge with a curved, rounded surface B. The pixels of planar surfaces O1, O2, and O3 should have intrinsically uniform energy values that differ from each other on the basis of the assumed lighting model. The energy values of the curved, rounded surface should vary continuously along the curvature.

F1 identifies a first triangular surface element with vertices E11, E12, E13 within first object surface O1, one side of which coincides with connecting edge K of surfaces O1 and O2 between vertices E12 and E13. Vertices E11, E12, and E13 all have the same energy value triplets (R11, G11, B11)=(R12, G12, B12)=(R13, G13, B13).

F2 identifies a second triangular surface element with vertices E21, E22, and E23 within second object surface O2, one side of which coincides with connecting edge K of surfaces O1 and O2 between vertices E13 and E23. Vertices E21, E22, and E23 have the same energy values (R21, G21, B21)=(R22, G22, B22)=(R23, G23, B23), which differ from the energy value triplets of the vertices of surface element F1.

To illustrate the principle, vertices E12 and E13 of first surface element F1 are coincident with vertices E22 and E23 of second surface element F2. In this case, vertex E12 of first surface element F1 is assigned the energy triplet (R12, G12, B12), which is different from the one assigned to vertex E23 having the same coordinates, to which energy triplet (R23, G23, B23) is assigned. The same applies to vertices E13 and E22.

Because the energy values of all vertices of F1 are identical, the interpolation also supplies the same energy value triplets for all pixels within F1. The same applies to F2. If the energy values of F1 and F2 can be adequately distinguished visually, a clear edge K that separates surfaces O1 and O2 having intrinsically uniform color shadings appears in the monitor display.

The continuously curved, rounded surface B is approximated by triangular surface elements F3, F4, etc. In the schematically illustrated example, it is assumed that vertices E31 and E32 of the third surface element, which lie in surface O3 of the object, have the same surface normal orientations and the same energy values (R31, G31, B31)=(R32, G32, B32), which, however, differ from the energy values of the pixels inside surface O3 due to the orientation of the surface normals in vertices E31 and E32, which differs from the surface normals inside O3.

The energy value triplet (R33, G33, B33) of vertex E33 of the third surface element differs from the energy value triplets of vertices E31 and E32. Only the coordinates of vertices E31, E32, and E33 and their assigned energy value triplets are transferred from the CPU to the graphics card. The interpolation carried out in the graphics card yields a gradual shading transition within the surface element along the curvature of rounded surface B.

Triangular surface element F4, which continues the approximation of continuously curved, rounded surface B toward F3, contains vertices F41, E42, and E43, with vertices E41 and E43 of surface element F4 coinciding with vertices E32 and E33 of surface element F3 and the sides of the surface elements connecting the vertices. Because a continuous color shading transition is desired for rounded surface B, the energy value triplets of E33 and E43 are selected to be identical. For example, a common average surface normal orientation or a surface normal orientation derived from the rounded curvature of B itself can be used for vertices E33 and E43. Likewise, the energy value triplets for vertices E32 and E41 are identical, while energy value triplet (R42, G42, B42) of vertex E42 of the surface element differs at least from the energy value triplet of vertex E41 and, in the illustrated example, also typically differs from the energy value triplet of vertex E43. Because the energy value triplets at coincidental vertices of adjacent surface elements are identical, a continuous color shading transition is obtained, which provides a smooth, visual impression even with a rough approximation of the continuous curvature.

Only the coordinates of the vertices and the corresponding energy values are transferred from the CPU to the graphics card, where the energy values of all pixels in the two-dimensional object representation are calculated by interpolation, preferably by linear interpolation, from the transferred energy values of the vertices. Consequently, this also reduces the volume of data to be transferred, as opposed to conventional methods in which the vertex coordinates, surface normals of all vertices, and relative color values and parameters for physical surface properties (perfectly diffuse, reflective components, etc.) must also be transferred. Methods for converting between three-dimensional coordinates and two-dimensional coordinates are sufficiently well-known. The two-dimensional representation is provided, in the end, by the division of the monitor display area into pixels.

The features described above and in the claims can be advantageously implemented both individually and in various combinations. The present invention is not limited to the described embodiments, but can be modified in a number of ways according to the abilities of those skilled in the art. In particular, the interpolation can be carried out in a three-dimensional object model as well as after being mapped to a two-dimensional representational plane.

What is claimed is:

1. A method for two-dimensional representation of an object on a display device, the object including at least one surface, the display device being controlled by an image generating unit, the image generating unit receiving image data from a central processing unit over a data line, the method comprising:

dividing the at least one surface of the object into at least one polygon surface element;

determining respective coordinates and respective first pixel values for vertices of each of the at least one polygon surface element using the central processing unit based on a respective lighting model;

transferring the respective coordinates and the respective first pixel values of the vertices to the image generating unit over the data line; and generating respective second pixel values of non-vertex pixels of the object in the image generating unit using interpolation between the first pixel values;

wherein the second pixel values are generated as energy values using the interpolation and further comprising displaying the at least one surface element in a respective uniform color.

2. The method as recited in claim 1 wherein the first pixel values include respective energy values for predetermined basic colors.

* * * * *